United States Patent [19]

Hilterhaus et al.

[11] 4,351,354

[45] Sep. 28, 1982

[54] SUPPLY CONTROL APPARATUS FOR A MIXING CHAMBER

[75] Inventors: Karl-Heinz Hilterhaus, Georgsmarienhütte; Reinhard Möser, Belm, both of Fed. Rep. of Germany

[73] Assignee: Chemie-Anlagenbau Bischofsheim GmbH, Osnabruck, Fed. Rep. of Germany

[21] Appl. No.: 61,424

[22] Filed: Jul. 27, 1979

[30] Foreign Application Priority Data

Jun. 27, 1978 [DE] Fed. Rep. of Germany ....... 2832901
Jun. 27, 1978 [DE] Fed. Rep. of Germany ....... 2853783

[51] Int. Cl.³ .................. B08B 3/04; F16K 19/00
[52] U.S. Cl. .................... 137/240; 222/148; 222/318; 366/138; 137/625.47
[58] Field of Search .............. 137/240, 625.43, 625.47; 222/148, 318; 366/138

[56] References Cited

U.S. PATENT DOCUMENTS

| 1,075,898 | 10/1913 | Champ et al. | 222/318 |
| 1,260,756 | 3/1918 | Connelly | 137/625.47 |
| 3,026,183 | 3/1962 | Cole | 366/138 |
| 3,207,486 | 9/1965 | Rosenthal | 366/138 |
| 3,450,388 | 6/1969 | Stump | 366/138 |
| 4,043,486 | 8/1977 | Wiseby | 222/148 |

FOREIGN PATENT DOCUMENTS 2120635 11/1971 Fed. Rep. of Germany ...... 366/138

*Primary Examiner*—George L. Walton
*Attorney, Agent, or Firm*—Stevens, Davis, Miller & Mosher

[57] ABSTRACT

The supply of a reagent to a mixing chamber is controlled by apparatus comprising a housing 1 having an inlet for the reactant, an outlet 4 to the mixing chamer 5, an inlet 3 for a flushing medium, an outlet 6 for recirculating the reactant and, within the housing, a movable member 7 having first and second ducts 10 and 12, duct 10 connecting inlet 2 with either of outlets 4 and 6 independently, and duct 12 connecting inlet 3 with outlet 4 when inlet 2 and outlet 6 are connected, inlet 3 being blocked when inlet 2 and outlet 4 are connected.

5 Claims, 8 Drawing Figures

A

B

C

SUPPLY CONTROL APPARATUS FOR A MIXING CHAMBER

It has recently been proposed to use supply control apparatus comprising a housing having an inlet for the reactant, two outlets for the reactant, one leading to a mixing chamber and the other for recirculation of the reactant, and a rotatable valve member in the form of a hollow shaft with a lead-off duct to the periphery thereof. The reactant is introduced through the end of the shaft and, depending on the orientation of the valve, is conveyed through the duct to either of the outlets which may be, for example, spaced at 90 degrees. The valve is turned from time to time to allow discharge into the mixing chamber or to the recirculation duct, as desired.

Recirculation follows discharge into the mixing chamber and, at the same time, flushing is started, usually by introducing a suitable flushing medium directly into the mixing chamber through a separate inlet. Air is subsequently blown into the chamber. During both flushing and blowing, the mixing stirrer in the chamber is actuated.

The disadvantage of known apparatus for the systems generally and specifically described above is that, after mixing, the outlet into the mixing chamber is filled with the reactant and that flushing does not clean the outlet, which may be regarded as a blind whole in the wall of the mixing chamber during flushing, thoroughly. After each mixing operation, a residue of the reactant may be left to harden in the outlet. Particularly detrimental consequences arise when using reactants containing high density solids. During flushing, the solid particles are flung against the inner wall of the mixing chamber by the tangential forces produced by the rapidly rotating stirring means in the chamber and deposits are formed in the cavities of the outlet, the deposits eventually hardening. This disadvantage is also found when a valve in the form of a hollow shaft is replaced by a three-way valve.

Known control supply apparatus comprises a valve which allows the passage of either flushing medium or air and an on/off valve on the mixing head which can be used to determine the duration of each of the flushing and blowing stages. The use of air subsequent to the flushing medium is necessary in order to remove the medium.

According to the present invention, supply control apparatus suitable for use in the supply of a reactive material to a mixing chamber comprises housing having first and second inlets and first and second outlets and, within the housing, a movable member having first and second ducts, the first duct connecting the first inlet with either outlet independently, and the second duct connecting the second inlet with the first outlet when the first inlet and the second outlet are connected, the second inlet being blocked when the first inlet and the first outlet are connected.

The first inlet is for the reactant. The first outlet is for the passage of reactant to a mixing chamber. The second outlet is for recirculation of the reactant. The characteristic feature of the present invention is the provision of a second inlet, through which the flushing medium and air can be introduced, and this allows the direct flushing of the first outlet, in contrast to the supply control apparatus of the prior art. Nevertheless, flushing can still be achieved while the reactant is recirculated.

A further advantage of the present invention is that the flushing medium/air control valve used in the prior art is obviated. Instead, the direction of the reactant and flushing can be controlled by one control having three operating positions. In one position, the second inlet is blocked, so that no flushing can occur, and the reactant passes to the mixing chamber. In the other positions, the first inlet and second outlet are connected, as are the second inlet and first outlet, so that flushing can occur and the reactant is recirculated. In the second position, the flushing medium is passed through the system and, in the third position, air is blown in.

In one embodiment of the invention, which is based on the particular supply control apparatus described as an example of the prior art, there is, within the housing, a hollow rotatable valve member having an inlet at one end and a radial duct which can be connected with either of two radial outlets. In the present invention, a second, radial, inlet is provided together with a circumferential groove in the valve member, the groove connecting the second inlet and the outlet to the mixing chamber when the valve member is rotated so that the axial inlet is in connection with the recirculation outlet.

When the reactant comprises a mixture of a low viscosity liquid and particles of a high density solid, separation can be observed when the flow velocity changes, and particularly when the flow accelerates, owing to the difference in density between the solid and liquid components and the low relative friction. This is as a result of the fact that, under uniform hydrostatic pressure, the flow velocity of the liquid component can change more easily than that of the solid particles which must derive their acceleration energy from friction between the liquid and solid components. In practice, separation manifests itself in blockages which occur wherever the ducts are constricted, i.e. wherever the flow velocity increases. It is therefore desirable, in the apparatus of the invention, to effect a configuration of the reactant flow path which is least likely to cause separation.

In another embodiment of this invention, the two outlets and the two inlets are radially disposed with respect to a rotatable valve member. The outlets are disposed at equal angles (e.g. 90°) to, and on opposite sides of, the reactant inlet. The duct which connects this inlet with either inlet is curved, and the end opposite the reactant inlet during mixing, when rotated to allow recirculation, is then opposite the recirculation outlet. In this way, a short flow path is achieved which can be designed for optimum flow, and the duct is flushed by the reactant in opposite directions during mixing and recirculation. A circumferential groove is suitable for allowing connection of the flushing inlet with the mixing outlet during recirculation of the reactant.

The invention will now be described by way of example with reference to the accompanying drawings, in which.

Figure 1:
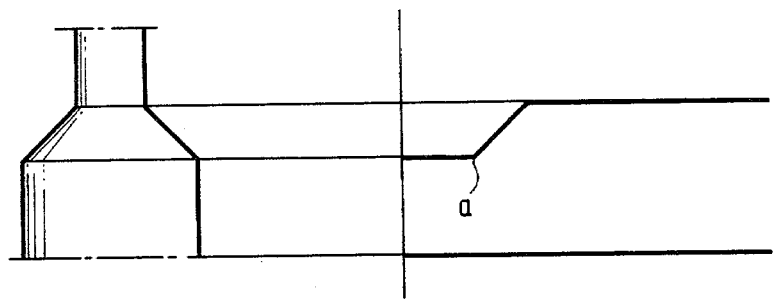
FIG. 1 illustrates the changes in flow rate as a function of speed (ordinates) against time (abscissae) for three configurations of a flow inlet of decreasing radius.
Figure 1:
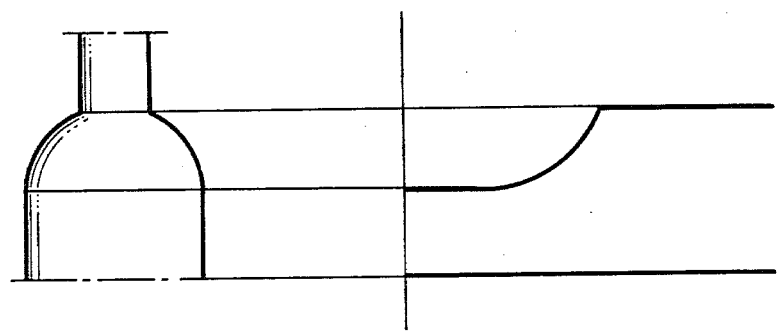
Figure 1:
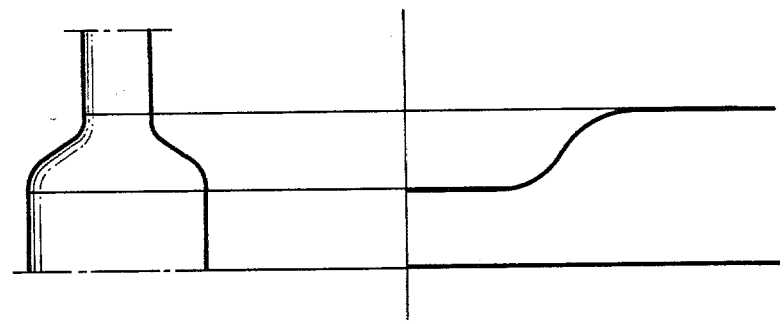

It can be seen from part A of FIG. 1 that separation is likely to occur at point a, as a result of the change in velocity at that point. In turn, that can lead to a build-up of solid particles and obstruction. Part C shows the most favourable flow characteristics. However, the invention is not limited to the configuration of the inlet, although the embodiment of the valve member shown in FIGS. 2 to 4 has the preferred configuration. The inlet shown in those Figures can be of the configuration shown in part A or part B of FIG. 1, if desired.

Figure 2:
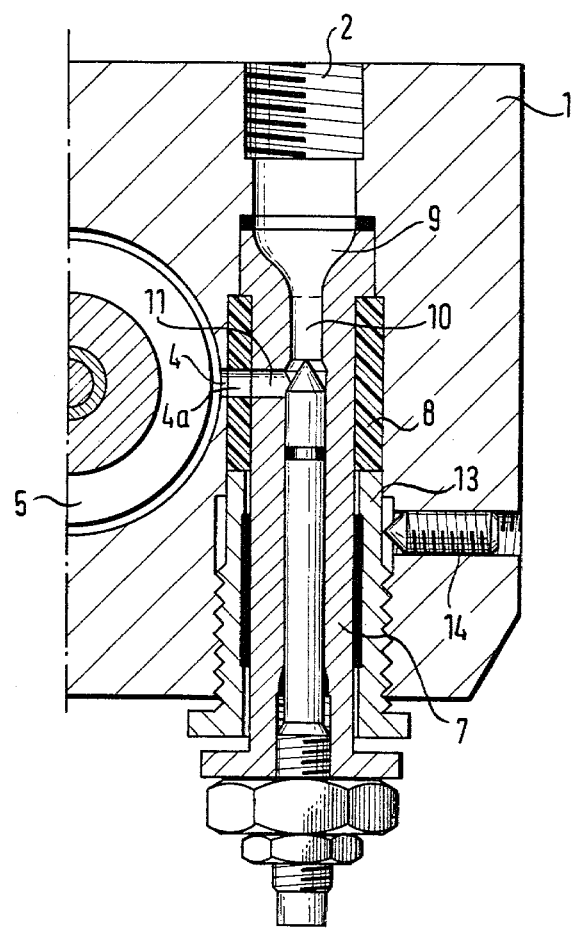
FIGS. 2 and 3 are mutually orthogonal longitudinal sections through apparatus embodying this invention.
Figure 3:
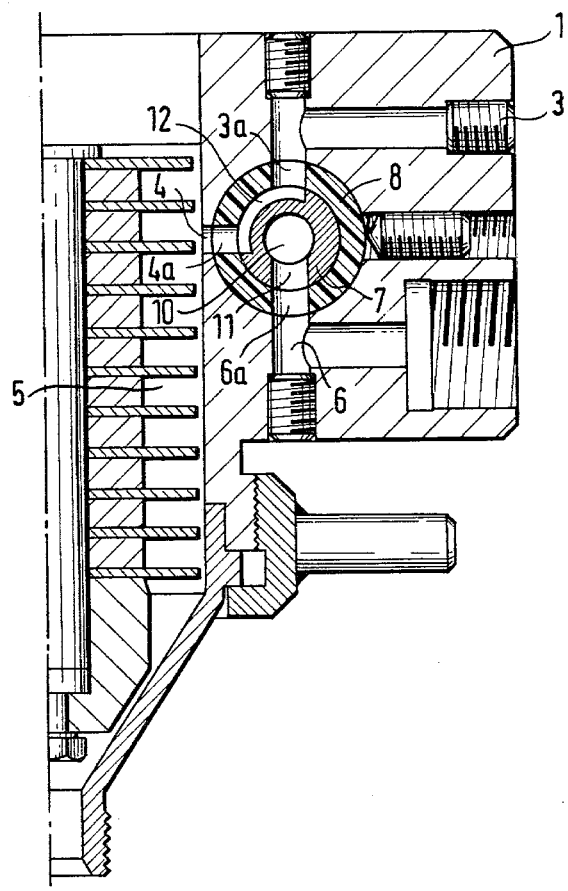

FIGS. 2 and 3 show a housing 1 having a reactant inlet 2, a flushing medium/air inlet 3, a mixing chamber outlet 4 leading to a mixing chamber 5 and a recirculation outlet 6. Within a cylindrical hole in the housing 1, there is a rotatable hollow cylindrical valve member 7 which, for ease of rotation, is separated from the housing 1 by a seal 8. The valve member 7 has an axial inlet 9, a hollow central tube 10 and a radial duct 11. As indicated above, the axial inlet 9 has the preferred configuration, of the type shown in part C of FIG. 1. The valve member also has a circumferential groove 12. The seal 8 has three radial apertures, 3a, 4a and 6a, which correspond respectively to the flushing inlet 3, the mixing chamber outlet 4 and the recirculation outlet 6.

Figure 4:
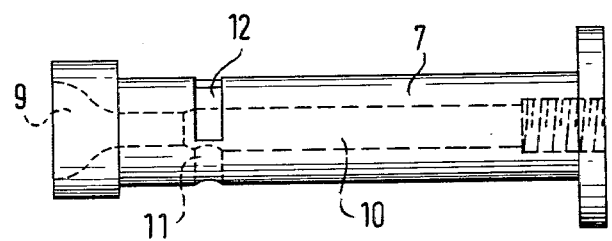
FIGS. 4 is a plan view of the valve member used in the embodiment of FIGS. 2 and 3 (FIG. 3 is a sectional view along the line A-B of FIG. 4)

The valve member 7, which is shown in plan in FIG. 4, can be rotated so that the radial duct 11 is aligned, either with outlet 4 and aperture 4a, or with outlet 6 and aperture 6a. In the former configuration, the inlet for the flushing medium is blocked but reactant can flow through the valve member 7 to the mixing chamber 5. In the latter configuration, which is that shown in FIGS. 2 and 3, the circumferential groove 12 allows flushing medium to pass to the mixing chamber 5, while reactant passes through the recirculation outlet 6.

FIG. 2 shows a screw 13 which can be used to tighten the seal and a locking screw 14.

Figure 5:
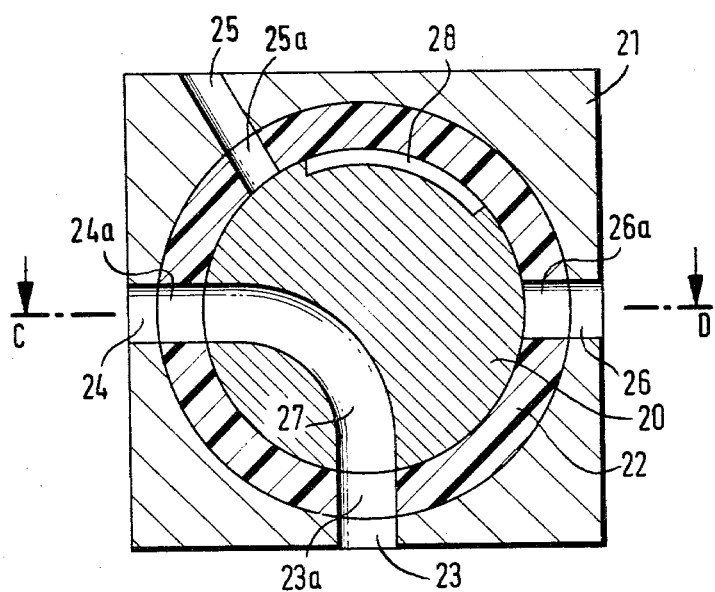
FIGS. 5 to 8 are sectional views of further apparatus embodying this invention.

FIG. 5 shows an alternative embodiment of the invention in the mixing mode. A rotatable valve member 20 is mounted in a housing 21 and separated therefrom by a seal 22. The housing comprises a reactant inlet 23, a mixing chamber outlet 24, a flushing inlet 25 and a recirculation outlet 26 (with respective corresponding seal apertures 23a, 24a, 25a and 26a). The valve member 20 includes an arcuate duct 27 and a circumferential groove 28. As shown in FIG. 5, the flushing inlet is blocked.

Figure 6:
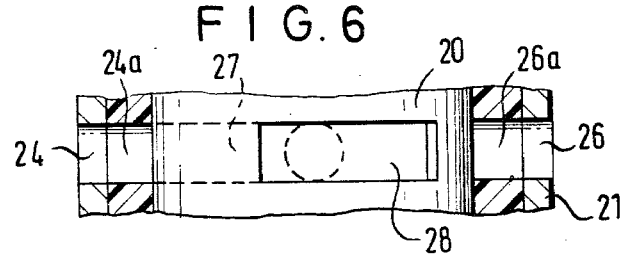
Figure 7:
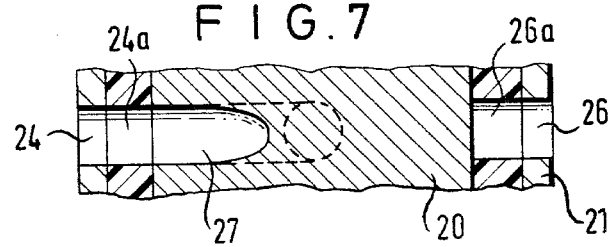

FIG. 6 is a plan view of the valve member 20, showing the groove 28, with the seal and the housing cut away along the line C-D of FIG. 5. FIG. 7 is a cross-sectional view along the line C-D of FIG. 5.

Figure 8:
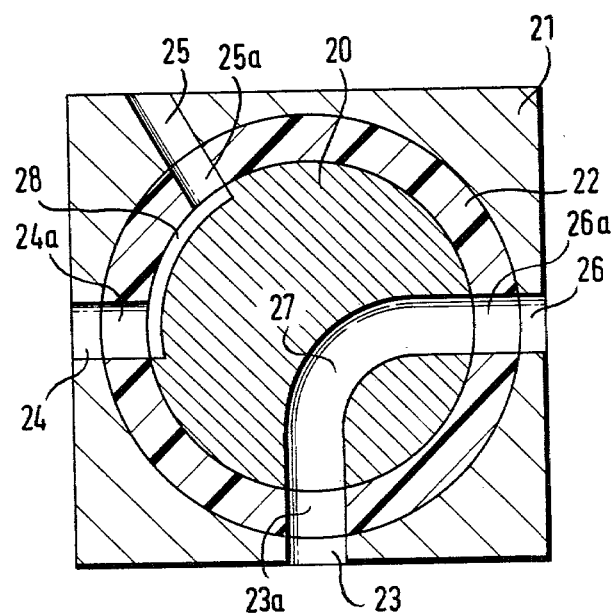

When, in the embodiment shown in FIGS. 5 to 7, the valve member is rotated anti-clockwise through 90°, the configuration shown in FIG. 8 is achieved. The duct 27 connects the reactant inlet 23 and the recirculation outlet 26, while the groove connects the flushing inlet 25 with the mixing chamber outlet 24. It will be readily appreciated that the reactant flows through the duct 27 in the opposite direction from that in which it flows in the configuration shown in FIG. 5.

If desired, a number of supply control apparatus of the invention may be mounted side-by-side so that a number of reactant streams can be controlled from the same point. An arrangement of this type is particularly useful when two mutually reactive reactants have to be metered into the same mixing chamber at exactly the same time. This is the case in the synthesis of polyurethanes, in which an exact amount of an isocyanate and an exact amount of a polyhydric alcohol must be metered in at the same time for the reaction to occur completely, which is the case within a few seconds.

The apparatus of the invention can be assembled, using prefabricated parts, to form a composite supply control apparatus with as many inlets and outlets as may be desired. It is also possible to provide a plurality of adjacent ducts and/or grooves in one rotary valve member.

It will be appreciated that an inlet or an outlet in the apparatus of the invention may be formed only indirectly in the housing if, for example, as in the embodiment of FIGS. 2 to 4, an inlet is formed in the movable member. Such embodiments are within the scope of the invention.

We claim:

1. A valve device for alternately supplying a chemical reactant to a mixing chamber associated therewith and a liquid for flushing the chamber to remove reactant and reaction products thereof from the mixing chamber, said valve device comprising a housing having a wall which encloses a substantially cylindrical bore, a first inlet through the housing into the bore for flow of chemical reactant, a first outlet in the housing spaced circumferentially from the first inlet for flow of reactant from said first inlet connected to said mixing chamber for transfer of said reactant to the mixing chamber through a conduit free from zones which create an area of quiesence where solid dispersed in the liquid flowing therethrough tends to settle out of the liquid and accumulate in the quiescent area, a second inlet through the housing for permitting a flow of flushing medium into said bore and a second outlet circumferentially spaced from the first inlet, recirculation of said reactant from the first inlet, and a valve core disposed in said bore, said valve core having a surface which is concentric with the said wall of the housing which encloses said bore, said walls of the valve core and housing disposed with an interface therebetween, said valve core being rotatable about its axis in the bore and having a first duct free from areas of quiescence which when said core is rotated to one position in the bore connects said first inlet with said first outlet for flow of reactant to said mixing chamber while blocking said second inlet and when the valve core is rotated to a second position connects said first inlet with said second outlet for recirculating said reactant between said first inlet and said second outlet, said valve core having a second duct disposed for connecting said second inlet with said first outlet for permitting the flow of flushing medium to the mixing chamber, and means for sealing said interface.

2. The valve device of claim 1 wherein said core has a valve stem having a bore extending longitudinally through the stem into said core which forms said first duct.

3. The valve device of claim 1 wherein said first duct is an arcuate shaped groove in the surface of said valve core associated with said first inlet.

4. The valve device of claim 1 wherein said valve device and a mixer comprising said mixing chamber are associated immediately adjacent to each other and the said first outlet is connected directly to an inlet in to the mixing chamber.

5. Apparatus according to claim 1 in which the inlets and the outlets are radially disposed, the two outlets being at equal angles to, and on opposite sides of, the reactant inlet, the first duct being arcuate and the second duct comprising a circumferential groove.

* * * * *